United States Patent
Thompson et al.

(10) Patent No.: US 6,663,492 B2
(45) Date of Patent: Dec. 16, 2003

(54) GAME ASSISTANT

(76) Inventors: Keith L Thompson, 13414 Cavalier Woods Dr., Clifton, VA (US) 20124; Eugene F Moran, 7804 Lake Dr., Manassas, VA (US) 22111

( * ) Notice: Subject to any disclaimer, the term of this patent is extended or adjusted under 35 U.S.C. 154(b) by 37 days.

(21) Appl. No.: 09/823,987

(22) Filed: Apr. 3, 2001

(65) Prior Publication Data

US 2002/0142847 A1 Oct. 3, 2002

(51) Int. Cl.[7] .............................................. A63F 13/00
(52) U.S. Cl. ............................................ 463/43; 463/9
(58) Field of Search ................................ 463/1–4, 8, 9, 463/29, 30, 42, 43, 46, 47; 273/368, 148 R, 292

(56) References Cited

U.S. PATENT DOCUMENTS

| | | | | |
|---|---|---|---|---|
| 4,136,881 A | * | 1/1979 | Anspach | 273/256 |
| 5,201,525 A | * | 4/1993 | Castro | 273/293 |
| 5,324,035 A | * | 6/1994 | Morris et al. | 273/139 |
| 5,411,259 A | * | 5/1995 | Pearson et al. | 463/36 |
| 5,662,332 A | * | 9/1997 | Garfield | 273/308 |
| 5,689,561 A | * | 11/1997 | Pace | 380/277 |
| 5,743,801 A | * | 4/1998 | Welander | 463/44 |
| 5,748,731 A | * | 5/1998 | Shepherd | 705/57 |
| 5,954,332 A | * | 9/1999 | Mero et al. | 273/138.2 |
| 6,061,656 A | * | 5/2000 | Pace | 380/277 |
| 6,129,631 A | * | 10/2000 | Hundal et al. | 273/292 |
| 6,131,906 A | * | 10/2000 | Green | 273/148 R |
| 6,196,547 B1 | * | 3/2001 | Pascal et al. | 273/139 |
| 6,325,292 B1 | * | 12/2001 | Sehr | 235/375 |
| 6,375,566 B1 | * | 4/2002 | Yamada | 273/308 |
| 6,398,651 B1 | * | 6/2002 | Yamada | 463/1 |
| 6,419,584 B1 | * | 7/2002 | Sakamoto et al. | 463/43 |

FOREIGN PATENT DOCUMENTS

| | | | |
|---|---|---|---|
| WO | WO 96/04968 | * | 2/1996 |
| WO | WO 01/03788 | * | 1/2001 |

OTHER PUBLICATIONS

Magic: The Gathering—Interactive Encyclopedia, 1999, game reviews from amazon.com and MobyGames.com.*

* cited by examiner

Primary Examiner—John M Hotaling, II

(57) ABSTRACT

A game assistant software program is provided which assists users in methodically or sagaciously building a competitive gaming collection or arrangement of game units, and which is a subset of a larger universe of gaming units, such as for games having units with offensive and defensive capabilities. The games can include card games, board games, or electronic games. The software program has a database containing knowledge of the capabilities of each competitive game unit or piece, and includes logic, which enables effective subset selection of game units, as well as a wish list of game units which will enhance the performance of existing game units. The program data is accessible over a global computer network.

6 Claims, 2 Drawing Sheets

GAME ASSISTANT

FIELD OF THE INVENTION

The present invention relates to a software program which assists users in building a competitive gaming collection or arrangement of units or pieces, and which is a subset of a larger universe of gaming units or pieces, such as for games having units with offensive and defensive capabilities, as well as other attributes related to game play. More particularly, the invention relates to a software program which assists users in building a competitive gaming collection or arrangement, wherein the games can include cards, game boards, or electronic games, using knowledge of the capabilities of each competitive game unit, and logic which enables effective subset selection of the game units. The invention is particularly applicable to trading card games which permit a user to assemble and employ a competitive collection of game units, such as trading cards.

BACKGROUND OF THE INVENTION

Trading card games are known in the amusement arts. Also, computer-based games are known in the amusement arts. There are many known types of inventory control systems to aid the game player in tracking and organizing their collection of playing pieces for complex card, board, and electronic games. Such organizational aids include simple home made pencil-and-paper based charts and tables, as well as sophisticated computer-based systems. However, the sophisticated computer systems generally simply perform the tasks of the older, simple pencil-and-paper systems, but in a faster or more detailed way.

Further, such prior devices and systems did nothing to provide the user with insight or guidance into selection of playing units or pieces to form an effective organized grouping such as a card hand.

U.S. Pat. No. 5,662,332 to Garfield relates to a trading card game method of play. In this patent, a card game of chance and strategy uses trading cards and a plurality of formats, and includes computer network capabilities. Individual cards represent gaming units having specified capabilities, including offensive and defensive capabilities, and players construct their own library of cards.

In U.S. Pat. No. 5,689,561 to Pace, a computer-based trading card game system and method are shown. The system includes a CD-ROM disk as well as floppy disks. The CD-ROM disk includes a software program, and the floppy disks include sets or subsets of gaming units. Locking keys are used, and trading of floppy disks takes the place of trading of individual cards.

U.S. Pat. No. 5,201,525 to Castro relates to a card game utilizing baseball trading cards. This patent teaches a mechanism for converting baseball cards into playing cards and for producing an order of plays from a random count, and wherein the object of the game is to collect trading cards from opponents.

In U.S. Pat. No. 5,411,259, a video sports game system is disclosed which uses trading cards. The game system has a control system for use with a television set, and individual trading card elements which are read by a card reader. The controller creates teams and conducts a game.

U.S. Pat. No. 5,743,801 to Welander relates to an electronic trading card game having trading cards and having a sports card game sequence.

U.S. Pat. No. 4,136,881 to Anspach relates to game equipment constructed to permit playing of two different gaming theories with equal chances of winning, for example monopolistic and competitive.

U.S. Pat. No. 5,954,332 to Yhero et al relates to a role playing game for 2–6 players which includes a plurality of game units and game cards, some of the game cards being scarcer than others.

U.S. Pat. No. 5,324,035 relates to a gaming system having a fixed pool of game plays, with permission of each player to purchase plays in a fixed pool stored in a master CPU.

SUMMARY OF THE INVENTION

From the foregoing, it is seen that gaming card systems are known which permit simple assembly or untutored selection of gaming units. However, there are no known gaming systems which utilize expert logic to assist a player in methodically arranging or sagaciously selecting gaming units. According to the present invention, a software system is provided which assists users in building a highly competitive gaming collection or arrangement of units or pieces, and which is a subset of a larger universe of gaming units or pieces, such as for games having units with offensive and defensive capabilities, as well as other attributes related to game play.

The software system of the present invention is used to assess the utility of possible game units or playing pieces in order to determine their effectiveness individually and in combination with each other as a competitive force or grouping to be used in a game employing a universe of such gaming units or pieces. The software system of the present invention is provided with information about the offensive and defensive capabilities and attributes of all possible playing pieces which might be used in the game. The software then takes into account the actual availability of a playing piece for play, as well as any user preferences to be applied as part of any selection criteria. The software system of the present invention will then calculate and assess the best combination(s) of playing pieces for use in the game and will inform the user of the results.

Additionally, the software will keep track of the player's game unit inventory, and, if applicable, the value of the game pieces.

Typically, in a card game of this type, there are a limited pool or universe of cards which can be used to form a game deck. The preferences of the user can be taken into account, for example to form a game deck employing the user's favorite cards, tactics, or themes.

Further, the software system of the present invention will also be capable of identifying a "wish list" deck, namely one that is made up primarily of cards in the existing inventory, but also containing recommendations that the user acquire some limited number of additional cards which would offer opportunities for construction of even more effective game decks. Another unique feature of this invention is the ability to skew game piece selection based on market value. Less valuable game pieces of the same capability are preferably selected first, in order to preserve the condition and value of higher valued pieces.

The software system of the present invention is applicable to numerous trading card games or theme card games currently on the market. The software system of the present invention may also be capable of calculating the relative market value of the collection of game pieces based on average street values for the game units or pieces and the current players inventory of game units or pieces.

The software system of the present invention can be extended to non-card games, as well. It can be applied to any competitive card game, board game, or electronic game where there is a need to assess the relative strengths and weaknesses of a large number of possible playing pieces in order to select a subset of those pieces which would comprise the strongest available team or unit with which to play the game.

Other objects and advantages of the present invention will be more readily apparent from the following detailed description when read in conjunction with the accompanying drawings.

DETAILED DESCRIPTION OF THE INVENTION

Figure 1:
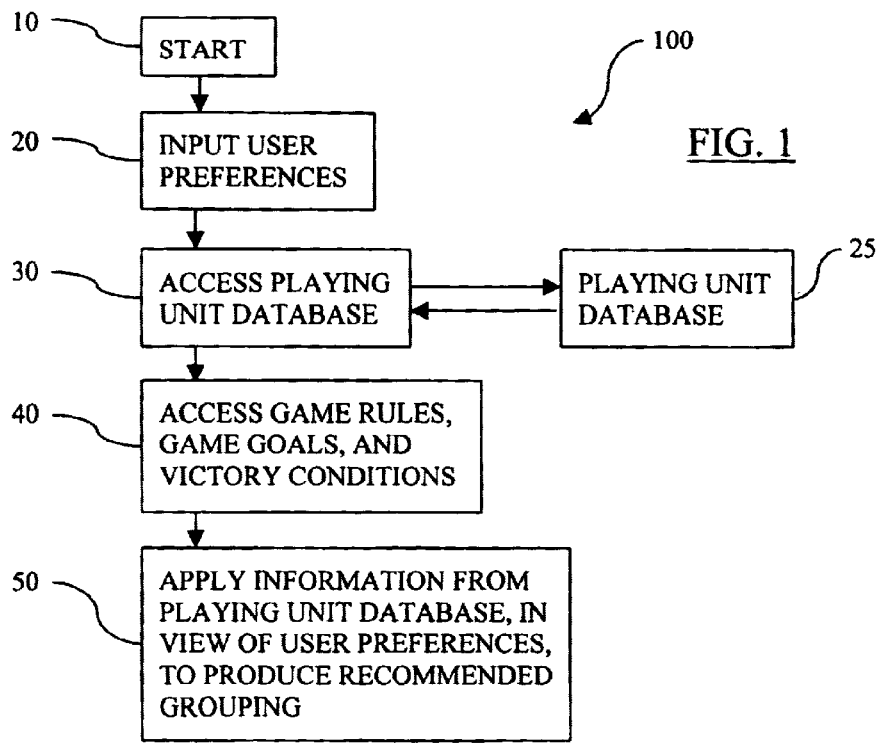
FIG. 1 is a flow chart illustrating steps of selecting a recommended grouping of playing units, according to the present invention.

A flow chart is shown in FIG. 1, illustrating steps of selecting a recommended grouping of playing units. For purposes of this disclosure, playing units are intended to include at least one of: game pieces, game units, trading cards, playing cards, theme cards, and non-card game tokens.

A software system 100 can be provided in a typical package for use on a personal computer (PC), or in a stand alone unit, such as Game Boy or Palm Pilot. Client-server games and internet based game usage are also included within the scope of this disclosure. The software system 100 of the present invention is intended to assist users in building a competitive gaming collection or arrangement of units or pieces, and which is a subset of a larger universe of gaming units or pieces, such as for games having units with offensive and defensive capabilities, as well as other attributes related to game play.

The software system 100 can be applied to the types of games which can include card, board, or electronic games. The software system 100 uses knowledge of the capabilities of each competitive game unit or piece, and logic which enables effective subset selection of game units. The logic includes the rules for selection of the game pieces, including the rules and conditions in which the game units are used in the game.

For example, in a fictitious war game, an infantryman and his rifle are separate pieces. The infantryman is considerably more effective if he has a rifle, although the rules of the war game do not demand that the infantryman have a rife. The infantryman may have the option of rifle launched grenades, or may elect to trade his rifle for a bazooka and projectiles. This decision may be influenced by the physical characteristics for this playing piece. If the infantryman is five foot, two inches tall and weighs 135 pounds, then he may be better off with a rifle and limited number of projectiles, as his agility would be greatly diminished by further burdening him with heavy objects to carry. These type of decisions would be incorporated within the rules for selection. The software can be programmed in an expert manner to weigh and balance the factors for consideration of many experts all at once, and then assess the best implementation among many possible implementations.

The purpose of the software system 100 is to serve as a game assistant. This is to assist the user in the decision making process for selecting some number of game pieces or units from a larger universe of game pieces or units, in order to provide the user with an effective mix of game pieces or game units with which to play the game. The selection process involves analyzing the playing capabilities of the individual game pieces in a manner that assesses the effectiveness of individual game pieces and combinations of game pieces in order to identify and recommend one or more competitive game units to be used in the game for which the pieces are intended to be used. The greater the number of possible playing pieces and the more complex their playing characteristics, the more difficult the task of manually analyzing and assembling an effective playing unit becomes, and the greater the utility of the game assistant of the present invention in the form of the software system 100.

The software system 100 advantageously brings to bear the high speed analytical capabilities of a home computer or PC on a process heretofore performed merely on an intuitive basis from a player's own gaming experiences. In order to do this, the software system 100 of FIG. 1 includes a playing unit database 25 and has access to game rules and rules for selection, game goals, and victory conditions (step 40)

As shown in FIG. 1, the software system 100 starts at step 10, permits user input, such as collection, content and preferences at step 20, and then accesses at step 30 the playing unit database 25. The software system 100 then accesses at step 40 the game rules, including the selection rules, game goals, and victory conditions. Following this step, an analysis is performed at step 50 of the information from steps 30 and 40, taken in view of the user preferences input at step 20, to produce a recommended grouping. The output or display step may be accessed by a computer monitor or a personal digital assistant, such as a palm pilot apparatus.

The game assistant software system 100 of the present invention is provided with an extensive data set that includes the play characteristics of all possible playing pieces for a particular game and the user identifies which game pieces and how many of them, i.e. which ones, are in their collection. The game assistant of the present invention is programmed to assess the user's actual inventory, apply logical valuations and calculations to those game pieces (as would a game expert, for example) in order to estimate the value and effectiveness of various combinations of playing pieces. The game assistant of the present invention will then present the user with recommendations regarding various combinations of playing units.

Although the game assistant of the present invention is programmed to provide the best possible combinations of playing pieces, the reality is that the user will often want to influence the decision making process and so allowances for user preferences are accommodated. This permits the user to have a sense of control or authorship in the gaming unit that is ultimately suggested by the game assistant of the present invention. The logic of the game assistant of the present invention is such that it permits the user to influence a number of parameters in the analytical process, primarily by expressing preferences early in the decision process that will impact the final make-up of the gaming unit. The logic of the game assistant of the present invention then factors those preferences into the evaluation process. The game assistant of the present invention maintains a high level of confidence that a competitive gaming unit will be recommended by compensating for poor user choices and enhancing good user choices.

The process for selecting the game pieces or combinations of pieces for inclusion in the gaming unit is an iterative one requiring that subsequent calculations and decisions be influenced by prior calculations and decisions. This sequential and iterative process seeks to ensure that the resultant recommendations will represent an effective and balanced gaming unit with the weaknesses and strengths of prior selections being offset and/or augmented by subsequent selections. Because these calculations take place at very high speed, it is possible to compare an incredible number of game piece combinations and permutations in a very short span of time. This permits the game assistant of the present invention to develop selections and make recommendations to the user that represent a marked improvement in the overall effectiveness of the gaming unit in a much shorter amount of time than would have otherwise been possible.

Through extrapolation of available data relating to all possible gaming pieces, the game assistant of the present invention is able to recommend a game unit that includes a number of game pieces that are not contained within the user's physical collection. This may result in a game unit being recommended that is even more effective than would have been possible if only the user's actual collection was used as the pool of potential gaming pieces. This ability to perform "what-if" logical calculations is another unique feature not heretofore seen in the gaming environment and makes the game assistant an even more desirable tool to the game player and game piece collector.

There will be an extensive inventory capability within the software system 100, as it will rely on the thoroughness and integrity of game piece data in order to make accurate calculated recommendations.

With respect to card games, the game assistant of the present invention is intended to identify the best combination of cards for use as a competitive game deck in a theme deck or trading card game. Typically, there are a limited number of cards that may be assembled into a game deck. This game deck typically represents a subset of the cards in the user's inventory of available cards. The game assistant of the present invention would help the user identify the combination(s) of cards that represent the strongest competitive game deck that is capable of being assembled given the limitations imposed by the user's actual card inventory and the user's expressed preferences for the game deck composition (i.e., favorite cards, tactics, or schemes).

The game assistant of the present invention will also be capable of identifying a "wish list" of game units that is made up primarily of cards in the existing inventory, but also containing recommendations that the user acquire some number of additional cards which would offer opportunities for construction of even stronger game deck(s). There are multiple trading card games or theme card games currently being marketed to which this software could be applied. The software will also be capable of calculating the relative market value of the collection of game pieces based on average published values for the pieces and the current player's inventory of game pieces.

It is additionally contemplated as being within the scope of the present invention to permit updating of game data, game collection information, price information, and the like, via use of a global computer network (such as the world wide web or the internet, or through other known network means).

Figure 2:
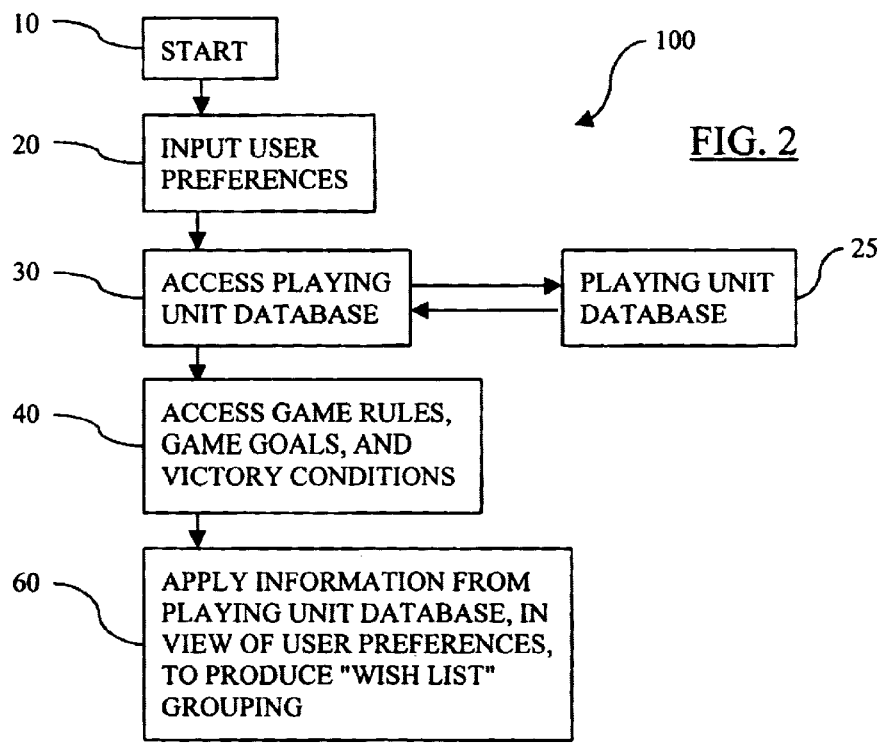
FIG. 2 is a flow chart illustrating steps of selecting a "wish list" of playing units, according to the present invention.

FIG. 2 is a flow chart illustrating steps of selecting a "wish list" of playing units, according to the present invention. As shown in FIG. 2, the software system 100 starts at step 10, and permits user input, such as collection content and preferences at step 20, and then accesses at step 30 the playing unit database 25. The software system 100 then accesses at step 40 the game rules, selection rules, game goals, and victory conditions. Following this step, an analysis is performed at step 60 of the information from steps 30 and 40, taken in view of the user preferences input at step 20, to produce a "wish list" grouping. The output or display step is conventional, and therefore omitted.

Figure 3:
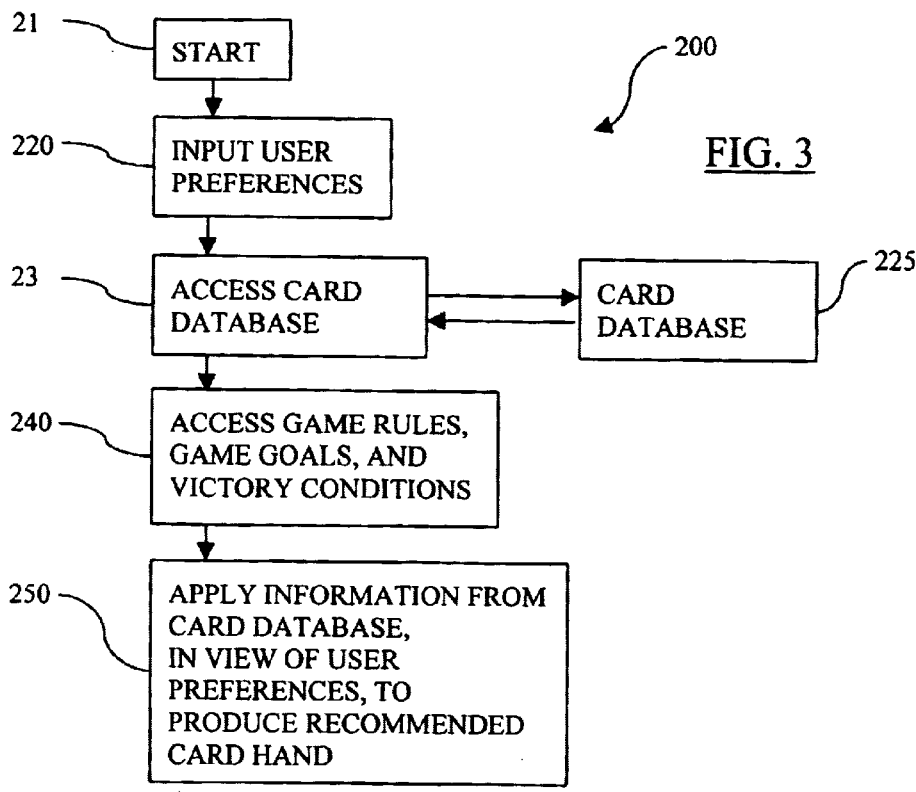
FIG. 3 is a flow chart illustrating steps of selecting a recommended card hand, according to the present invention.

FIG. 3 is a flow chart illustrating steps of selecting a recommended card hand, according to the present invention. These steps are similar to those shown in FIG. 1, except that in FIG. 3 the software system 100 is particularly applicable to trading card games which permit a user to expertly assemble a collection of game cards. As shown in FIG. 3, a software system 200 starts at step 210, permits input of user preferences at step 220, and then accesses at step 230 a card database 225. The software system 200 then accesses at step 240 the game rules, selection rules, game goals, and victory conditions. Following this step, an analysis is performed at step 250 of the information from steps 30 and 40, taken in view of the user preferences input at step 20, to produce a recommended card hand or card battle-group or the like. The output or display step is conventional, and therefore not detailed herein.

Figure 4:
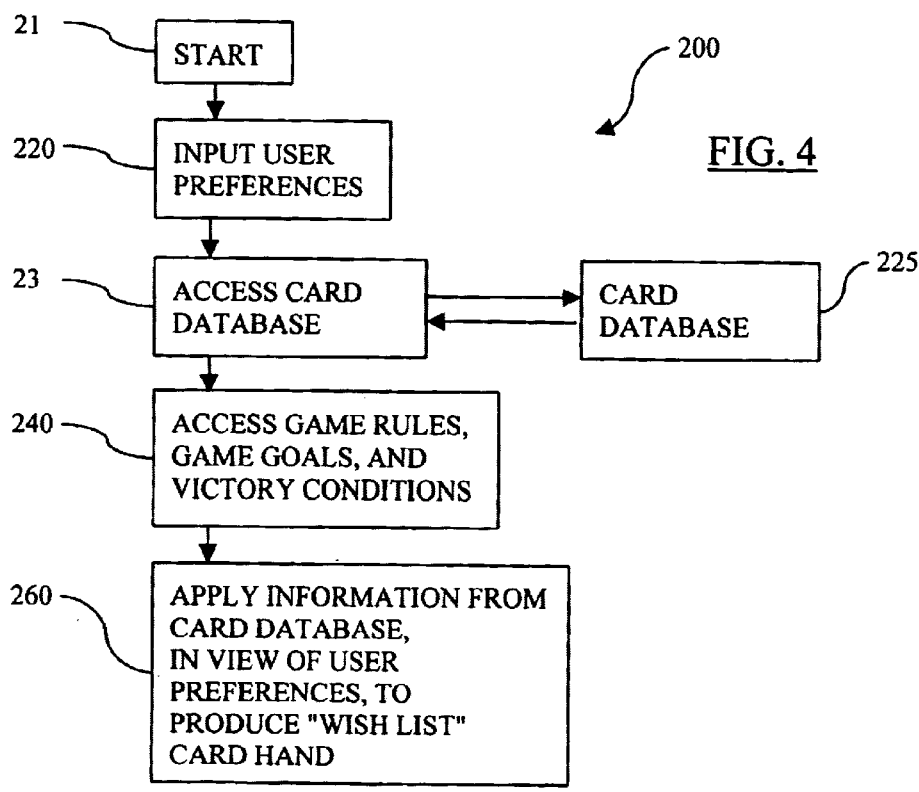
FIG. 4 is a flow chart illustrating steps of selecting a "wish list" card hand, according to the present invention.

FIG. 4 is a flow chart illustrating steps of selecting a "wish list" card hand, according to the present invention. As shown in FIG. 4, a software system 200 starts at step 210, permits input of user input, such as collection content and preferences at step 220, and then accesses at step 230 a card database 225. The software system 200 then accesses at step 240 the game rules, including selection rules, game goals, and victory conditions. Following this step, an analysis is performed at step 260 of the information from steps 30 and 40, taken in view of the user preferences input at step 20, to produce a recommended card hand or card battle group or the like. The output or display step is conventional, such as a computer monitor or personal digital assistant, often referred to as a (palm pilot).

The invention being thus described, it will be evident that the same may be varied in many ways. Such variations are not to be regarded as a departure from the spirit and scope of the invention and all such modifications are intended to be included within the scope of the claims.

We claim:

1. A game assistant software program comprising:
   said game assistant software program that expertly and sagaciously selects and recommends an assembly of game units, which is a subset of a larger universe of game units comprising:
   a) a software logic which enables said expert and sagacious selection of a subset of game units from a larger universe of related game units for use in a game,
   b) a database including data for each of the known game units in the universe of related game units,
   c) incorporation of a user input with respect to said software logic and including parameters governing the makeup of an assemblage of said game units, and
   d) an ability to update elements comprising the game assistant software.

2. The game assistant software program of claim 1 wherein the recommended assembly of game units constitutes a playable assemblage of game units that conform to said parameters governing the makeup of an assemblage of game units which may be played in the game.

3. The game assistant software program of claim 2 wherein the logic generates recommended assemblies of game units that constitute at least one of:

a competitive assembly of game units representing a subset of the available universe of game units, an assembly of game units based upon user input, a wish list assembly of game units representing a subset of the universe of all known game units.

4. The game assistant software program of claim 1, wherein the game units comprise at least one of:

game pieces, game units, trading cards, playing cards, theme cards, and non-card game tokens.

5. The game assistant software program of claim 1, wherein the logic for assembly of game units permits and accommodates user input with regard to at least one of the following typical game unit assembly features:

inclusion of specific game units, exclusion of specific game units, assemblies which reflect specified strategic characteristics for the assembled gaming unit, assemblies which reflect specified thematic characteristics for the assembled gaming unit.

6. The game assistant software program of claim 1 wherein a provision is made to update at least one of:

the logic for expert and sagacious selection and assembly of game units, the game unit collection data, availability of game units for selection, user input, parameters governing the makeup of any assemblage of game units which may be played in the game, game unit value and characteristics of play for each game unit.

\* \* \* \* \*